(12) United States Patent
Wakabayashi

(10) Patent No.: US 6,292,104 B1
(45) Date of Patent: Sep. 18, 2001

(54) CAPACITANCE TYPE DETECTOR

(75) Inventor: Kazuhiro Wakabayashi, Osaka (JP)

(73) Assignee: Nohken Inc., Osaka (JP)

( * ) Notice: Subject to any disclaimer, the term of this patent is extended or adjusted under 35 U.S.C. 154(b) by 0 days.

(21) Appl. No.: 09/617,134

(22) Filed: Jul. 14, 2000

(30) Foreign Application Priority Data

Nov. 1, 1999 (JP) ................................. 11-311267
Mar. 17, 2000 (JP) ................................. 12-076027

(51) Int. Cl.⁷ .................................... G08B 21/00
(52) U.S. Cl. .................... 340/612; 340/618; 340/635; 340/657; 340/620; 340/870.37
(58) Field of Search ..................... 340/612, 618, 340/870.37, 635, 657, 620; 73/304 C, 804.23, 863.01, 290 R; 324/601, 686, 690, 688, 689, 607

(56) References Cited

U.S. PATENT DOCUMENTS

| | | | |
|---|---|---|---|
| 4,499,640 | 2/1985 | Brenton et al. | 29/25.41 |
| 4,912,967 * | 4/1990 | Labriola, II | 340/620 |
| 5,245,873 * | 9/1993 | Fathauer et al. | 73/304 |
| 5,265,482 * | 11/1993 | Davis et al. | 73/863.01 |
| 5,489,371 * | 2/1996 | Joseph et al. | 204/415 |
| 5,973,415 * | 10/1999 | Brenner et al. | 307/118 |

FOREIGN PATENT DOCUMENTS

| | | | |
|---|---|---|---|
| 59-54928 | 3/1984 | (JP) . | |
| 5-87612 | 4/1993 | (JP) . | |
| WO 88/10412 | 12/1988 | (WO) | 73/290 R |

OTHER PUBLICATIONS

European Search Report dated Sep. 21, 2000.

* cited by examiner

Primary Examiner—Jeffery Hofsass
Assistant Examiner—Hung Nguyen
(74) Attorney, Agent, or Firm—McDermott, Will & Emery

(57) ABSTRACT

From the time of power on, an output of a variable frequency generating circuit is kept matching with the resonance frequency of a resonance circuit. When an object of detection comes into contact or to the vicinity of a detection electrode and the resonance frequency of resonance circuit changes, a phase deviation is generated from the output of the variable frequency generating circuit. The deviation is detected by a phase comparing circuit, and a control circuit changes a control voltage so that the oscillation frequency of variable frequency generating circuit is changed to attain phase matching. This change is detected by a detection circuit, and presence/absence of the object is detected.

10 Claims, 13 Drawing Sheets

(a) PHASE COMPARISON FIRST INPUT (b) PHASE COMPARISON SECOND INPUT (c) PHASE COMPARISON PHASE DIFFERENCE SIGNAL PC (d) PHASE COMPARISON PHASE DIFFERENCE SIGNAL LD (e) CONTROL SIGNAL

TIME

CAPACITANCE TYPE DETECTOR

BACKGROUND OF THE INVENTION

1. Field of the Invention

The present invention relates to a capacitance type detector. More specifically, the present invention relates to a capacitance type detector for near contact or contact detection of an object contained in a container, such as a gas or a powder and granular material, using dielectric constant of the object as a capacitance value.

2. Description of the Background Art

Conventionally, a capacitance type detector has been used when a level of an object, for example, is to be detected, as the capacitance type detector is applicable to wide range of objects to be detected including liquid, powder, sediments in a liquid, water and oil and it is easy to install and has no variable unit.

The wide range of applicable objects, however, is realized by changing a structure of an electrode portion of the detector, or by changing components including addition or exchange of components of a circuitry, for example. Further, as the capacitance is measured based on the dielectric constant of a substance, the detector is susceptible to environmental capacitance such as the capacitance of the container. Accordingly, on-site calibration is necessary before detecting operation when the detector is set in a container, which is quite troublesome. Further, detector operation may be less stable when moisture percentage of the object changes because of moisture or when a small amount of a conductive object happens to be adhered on the detector.

In view of the above described problems, Japanese Patent Laying-Open No. 59-54928 describes a capacitance type material level indicator. The level indicator includes a constant oscillation circuit, an amplifier circuit, a resonance circuit having an electrode body of which capacitance changes in accordance with the object of detection, a phase comparing circuit, an automatic calibration circuit having a switch, and an output circuit. An oscillation signal from the constant oscillation circuit is supplied as an excitation signal through the amplifier circuit to the resonance circuit, phase difference between the oscillation signal and the excitation signal of which phase has been changed by the resonance circuit is detected by the phase comparing circuit, and a detection signal corresponding to the phase difference is applied to the automatic calibration circuit. When the switch is pressed, the automatic calibration circuit changes stepwise the operational characteristic of the resonance circuit so that the detection signal matches a reference signal. Further, application to the object and the calibration operation are facilitated, as the operation which takes place is to change the reference signal so that the reference signal matches the detection signal.

In this method, however, calibration is still necessary, though it is simply a pressing of the switch at the site. When an operator fails to calibrate, correct operation is not ensured. When it becomes necessary to change the place of setting, calibration is necessary every time. Further, it is difficult to utilize the resonance state of the resonance circuit, and therefore detection sensitivity may vary.

Japanese Patent Laying-Open No. 5-87612 describes another example, which is a liquid level detector using a PLL circuit. In this example, a PLL circuit is constituted by a phase comparing circuit, a loop filter (integrating circuit) and a voltage controlled oscillation circuit (VCO circuit), in which a pre-oscillation circuit is oscillated at an oscillation frequency in accordance with the object of detection, the oscillation frequency signal is input to the phase comparing circuit of the PLL circuit, and the frequency is compared with the frequency signal of the VCO circuit, so as to detect the object.

In the second example, however, any of the following predetermined conditions must be satisfied.

(1) When there is no object of detection, the oscillation frequency of the pre-oscillation circuit must be out of the lock range of the PLL circuit, and when the object comes to be in contact or in the vicinity, the oscillation frequency of the pre-oscillation circuit must be set within the locked range of the PLL circuit.

(2) When there is no object of detection, the oscillation frequency of the pre-oscillation circuit must be within the locked range of the PLL circuit, and when the object is brought into contact or in the vicinity, the oscillation frequency of the pre-oscillation circuit must be set outside the locked range of the PLL circuit.

(3) When there is no object of detection and when the object is brought into contact or in the vicinity, the oscillation frequency of the pre-oscillation circuit must be set within the locked range of the PLL circuit.

When the range of variation of the frequency of the pre-oscillation circuit and the locked range of the PLL circuit are to be set to satisfy the limited conditions, the site and the object must be taken into consideration, and therefore, setting is very difficult. In other words, applicable range may be limited.

SUMMARY OF THE INVENTION

Therefore, an object of the present invention is to provide a capacitance type detector which is free of any calibration, easy to handle, free of detection sensitivity variation, usable under wide range of conditions, less susceptible to conductivity of the objects and strong against static electricity.

In summary, the present invention provides a capacitance type detector detecting a level of an object in accordance with a capacitance of the object in a container, in which a resonance circuit is formed by a capacitance formed between an electrode body inserted to the container and the object of detection and a resonance transformer to be tuned with the capacitance; an output signal of the resonance circuit and a reference signal are subjected to phase comparison and a phase difference signal in accordance with the phase difference is output from a phase comparing circuit; and in accordance with the phase difference signal, a control signal to eliminate the phase difference is output from a control circuit. A frequency signal of an oscillation frequency in accordance with the control signal is generated from a variable frequency generating circuit and applied as a reference signal to phase comparing circuit, and the electrode body is driven by the frequency signal from the variable frequency generating circuit. The control signal output from the control circuit or the frequency signal output from the variable frequency generating circuit is compared with the reference value set by a reference value setting circuit, and a detection signal indicative of presence/absence of an object of detection is output. Based on the phase difference signal output from the phase comparing circuit, phase difference between a resonance frequency of the resonance circuit and the oscillation frequency of the variable frequency generating circuit is determined, and when it is determined that there is a phase difference, the phase comparing circuit operates such that the oscillation frequency of the variable frequency generating circuit follows the resonance frequency of the resonance circuit.

Therefore, according to the present invention, a loop is formed by the resonance circuit, the driving circuit, the phase comparing circuit and the variable frequency generating circuit, the resonance frequency of the resonance circuit is searched at the time of power on, and the electrode body is operated with the resonance frequency. Therefore, necessity of calibration by the operator at the site is eliminated, and therefore error caused by manual operation can be prevented, and the efficiency of operation can be improved.

Preferably, the phase difference determining circuit includes a reset circuit setting, when the phase difference signal output from the phase comparing circuit attains a prescribed value or higher, the frequency signal of the variable frequency generating circuit to the lowest frequency within the variable range of the frequency of the variable frequency generating circuit, and a mismatch detecting circuit comparing the phase of the oscillation frequency of the variable frequency generating circuit with the phase of the resonance frequency of the resonance circuit and outputting a detection signal from the detecting circuit when the phases do not match.

More preferably, the reset circuit includes an integrating circuit integrating the phase difference signal output from the phase comparing circuit, a voltage comparing circuit comparing the integration signal from the integrating circuit with a prescribed voltage value, and a switching circuit responsive to determination by the voltage comparing circuit that the integration circuit is not lower than said prescribed voltage value, for setting the oscillation frequency of the variable frequency generating circuit to the lowest frequency.

More preferably, the phase difference determining circuit operates such that the oscillation frequency of the variable frequency generating circuit follows the resonance frequency of the resonance circuit, at the time of power on.

More preferably, the control circuit includes a loop filter.

More preferably, the variable frequency generating circuit includes a voltage controlled oscillation circuit.

More preferably, the variable frequency generating circuit includes a constant oscillation circuit generating a constant frequency signal, and a frequency dividing circuit of which division ratio is variably set in response to the control signal from the control circuit, dividing with the set division ratio, the frequency signal generated from the constant oscillation circuit and outputting the result.

More preferably, the control circuit, the detecting circuit and the state determining circuit are implemented by a microprocessor.

According to another aspect, the present invention provides a capacitance type detector detecting a level of an object of detection in accordance with the capacitance of the object of detection in a container, in which a resonance circuit is formed by a capacitance formed between an electrode body inserted to the container and the object of detection and a resonance transformer to be tuned with the capacitance, an output signal of the resonance circuit and a reference signal are subjected to phase comparison and a phase difference signal in accordance with a phase difference is output from a phase comparing circuit, and in accordance with the phase difference, a control signal to eliminate the phase difference is output. A frequency signal of an oscillation frequency in accordance with the control signal from the control circuit is generated from a variable frequency generating circuit, by which the electrode body is driven; the control signal output from the control circuit and a reference value indicative of presence/absence of the object of detection set by a reference value setting circuit are compared and a detection signal is output; variation in the capacitance is indicated stepwise in accordance with the detection signal; based on the phase difference signal output from the phase comparing circuit, phase difference between the resonance frequency of the resonance circuit and the oscillation frequency of the variable frequency generating circuit is determined; and in response to a determination that there is a phase difference, the phase comparing circuit operates such that the oscillation frequency of the variable frequency generating circuit follows the resonance frequency of the resonance circuit.

More preferably, the detecting circuit includes a microprocessor, and the microprocessor includes: a detection state setting circuit setting whether the state of the object of detection is in a detection state or not; a signal processing setting circuit setting, responsive to whether the detection state is set by the detection state setting circuit, whether the frequency is for the detection state; a storing circuit storing the frequency for the detection state or frequency for the non-detection state set by the signal processing setting circuit; a comparing circuit comparing the frequency stored in the storing circuit and a present frequency applied from the variable frequency generating circuit, and outputting data indicating whether the present frequency is higher than the frequency for the detection state; and a circuit outputting data representing presence of the object of detection in response to a signal indicating presence of a phase difference from the state determining circuit, and outputting data from the comparing circuit in response to a signal representing absence of phase difference applied from the state determining circuit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Prior to the description of the embodiments of the present invention, the principle of the present invention, together with a resonance circuit used therein, will be described.

Figure 3A:
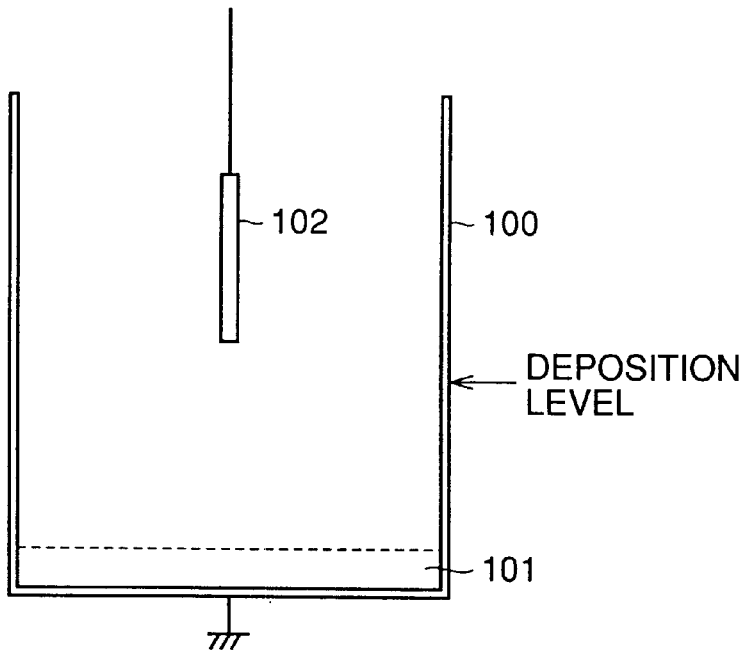
FIGS. 3A and 3B show a state where an electrode plate is inserted to a container.
Figure 3B:
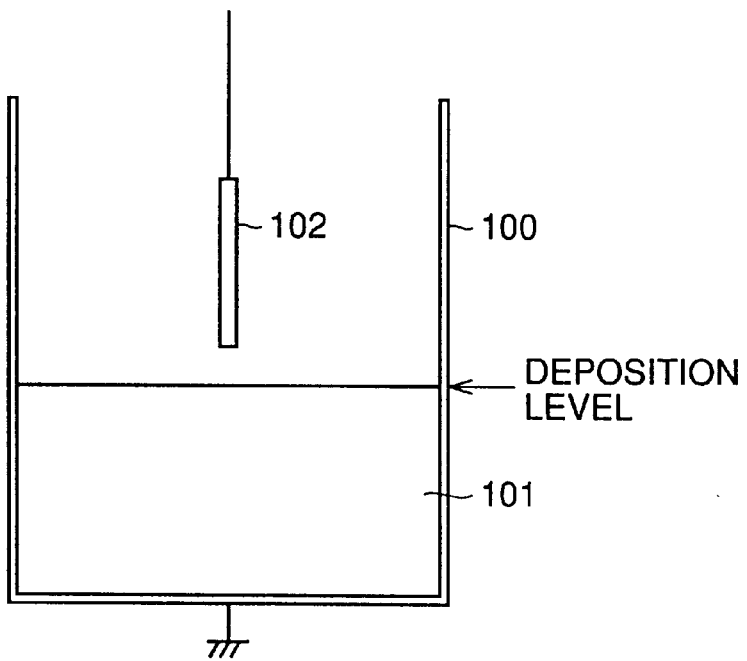
Figure 4:
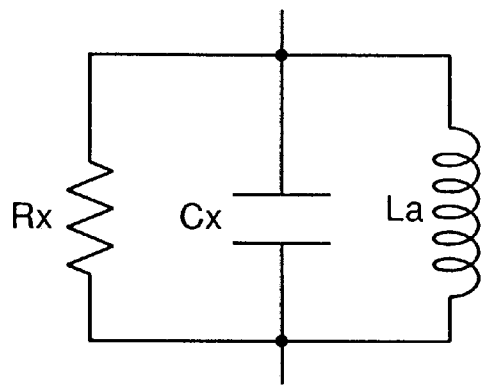
FIG. 4 is an equivalent circuit diagram of a resonance circuit.
Figure 5A:
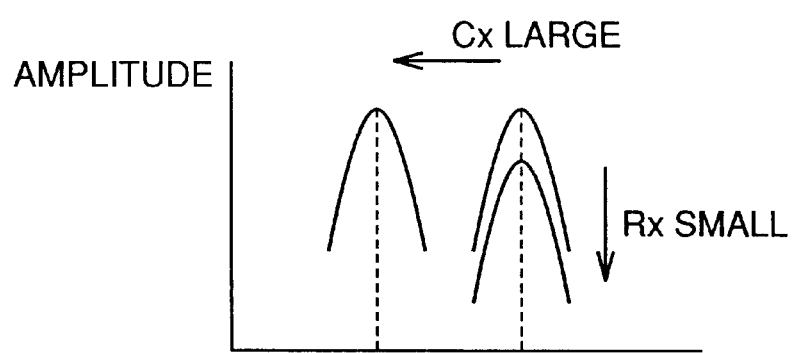
FIGS. 5A and 5B are graphs representing frequency-amplitude characteristic and frequency-phase characteristic of the resonance circuit.
Figure 5B:
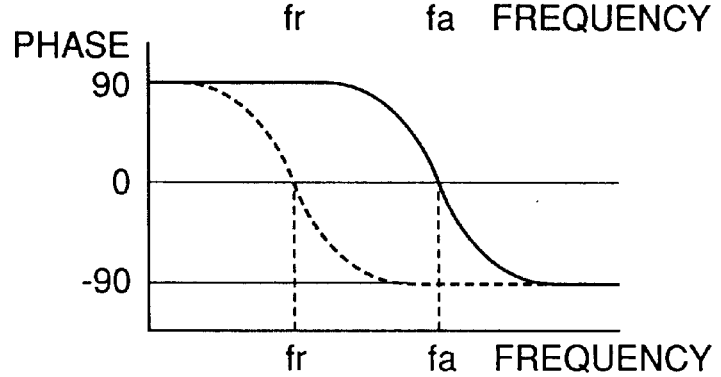

FIGS. 3A and 3B show states where an electrode plate is inserted to a container. FIG. 4 is a circuit diagram of the resonance circuit, and FIGS. 5A and 5B represent frequency-amplitude characteristic and frequency-phase characteristic of the resonance circuit.

Referring to FIG. 3A, a state in which the wall and the bottom of a container 100 are grounded, and an object of detection 101 does not exist or when the object does exist but the deposition level has not yet reach a predetermined detection position, will be referred to as non-detection state in the following description. In the state shown in FIG. 3B in which the object of detection 101 exists up to the deposition level, the object of detection 101 is in the vicinity of an electrode plate 102, or the electrode plate 102 is in contact with the object of detection 101, will be referred to as detection state.

In the present embodiment, when a power is turned on in the non-detection state shown in FIG. 3A, calibration operation automatically takes place, and thereafter measurement is performed. When the object of measurement 101 reaches the deposition level as shown in FIG. 3B, a detection signal representing the detection state is output.

The capacitance existing between the electrode plate 102 and the wall of container 100 differ between the non-detection state in which the object of detection 101 does not exist or the deposition level is extremely low in the container 100 and the detection state in which the object of detection 101 exists at least to the deposition level as shown in FIG. 3B.

A resonance circuit such as shown in FIG. 4 is formed by a parallel circuit including a capacitance component Cx formed by the capacitance between electrode plate 102 and the object of detection 101 in the container 100 and an inductance component La of the resonance transformer included in the electrode plate 102. The resonance frequency of the resonance circuit is represented by the following equation.

$$fa = 1/\{2\pi\sqrt{(LaCx)}\}$$

As is apparent from this equation, the resonance frequency is not dependent on the resistance component Rx. Further, as shown in FIG. 5A, the impedance of the resonance circuit is low in a low frequency range, and therefore there is a characteristic that the impedance is low with respect to static electricity.

Referring to FIGS. 5A and 5B, it is understood that the frequency and the phase of the resonance circuit are correlated. When the resonance frequency signal is input to the resonance circuit, phase difference is not generated. When a signal of a frequency lower than the resonance frequency is input, the phase difference comes close to 90°, and when a signal of a frequency higher than the resonance frequency is input, the phase difference comes close to −90°, with the degree of phase variation being steep near the resonance frequency. The value fa of FIGS. 5A and 5B represents the resonance frequency at the non-detection state, that is, when electrode plate 102 is in the air, and the value fr represents the resonance frequency when the object of detection 101 is in the vicinity of or in contact with electrode plate 102 as shown in FIG. 3B. Dependent on the level of the object of detection 101, the resonance frequency of the resonance circuit as well as the value of phase angle varies.

In the present invention, at the time of power on, the oscillation frequency is changed so that phase difference from the frequency of the resonance circuit is automatically made zero, as a calibration operation. In a measurement mode, the resonance frequency of the resonance circuit is always followed in accordance with the state of the object of detection 101 in the container 100, and presence/absence of the object of detection 101 is detected in accordance with the difference of the resonance frequency.

In the following, embodiments will be more specifically described.

Figure 1:
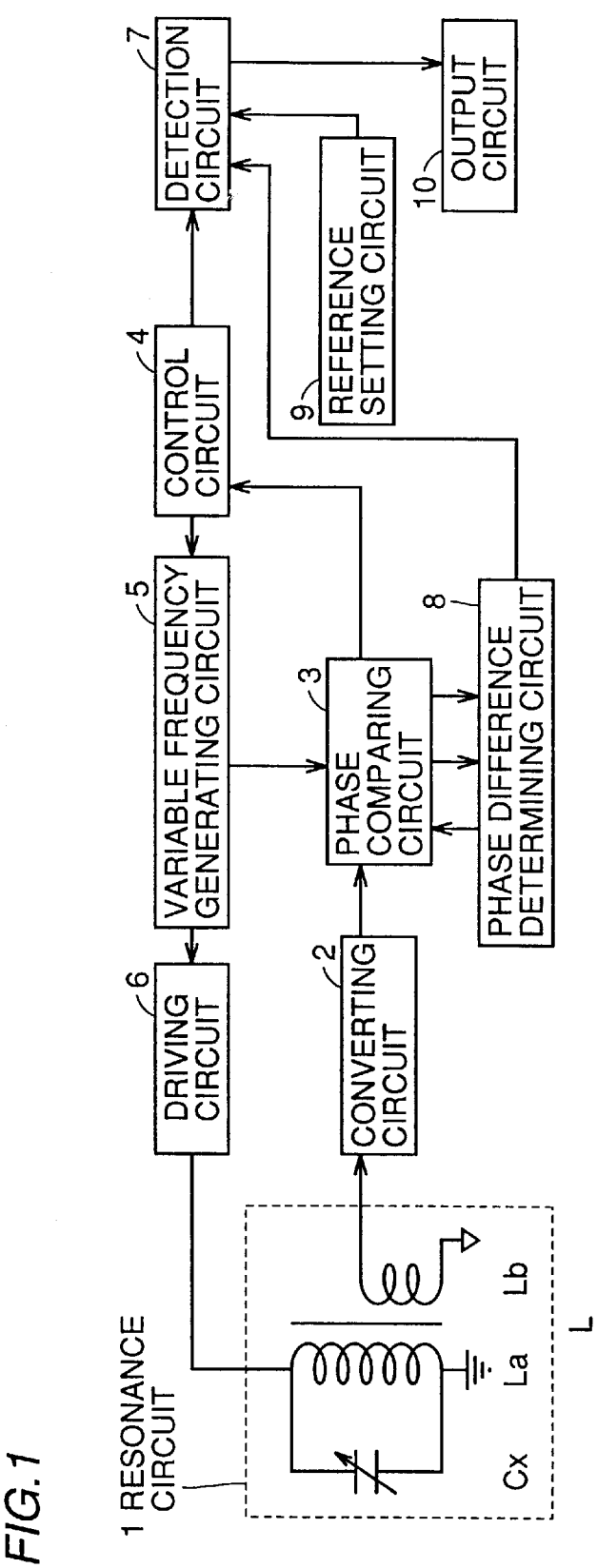
FIG. 1 is a block diagram of one embodiment of the present invention.
Figure 2:
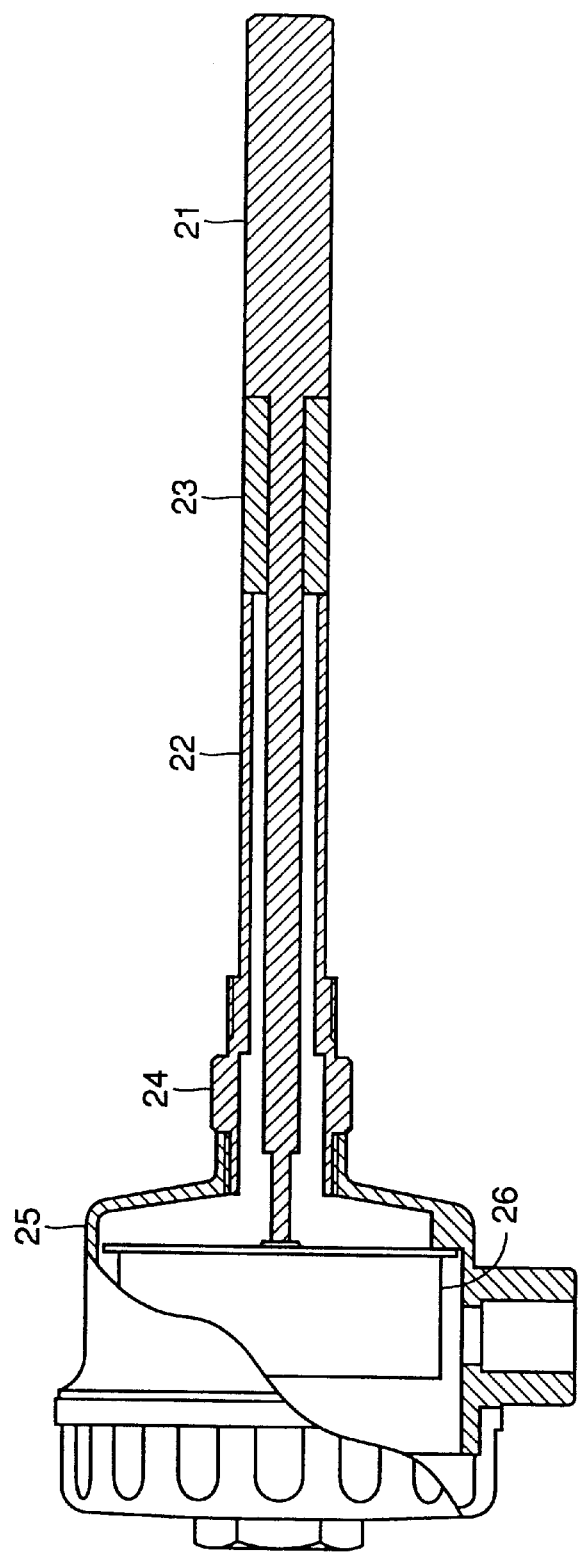
FIG. 2 shows an appearance of the capacitance type detector in accordance with an embodiment of the present invention.
Figure 6:
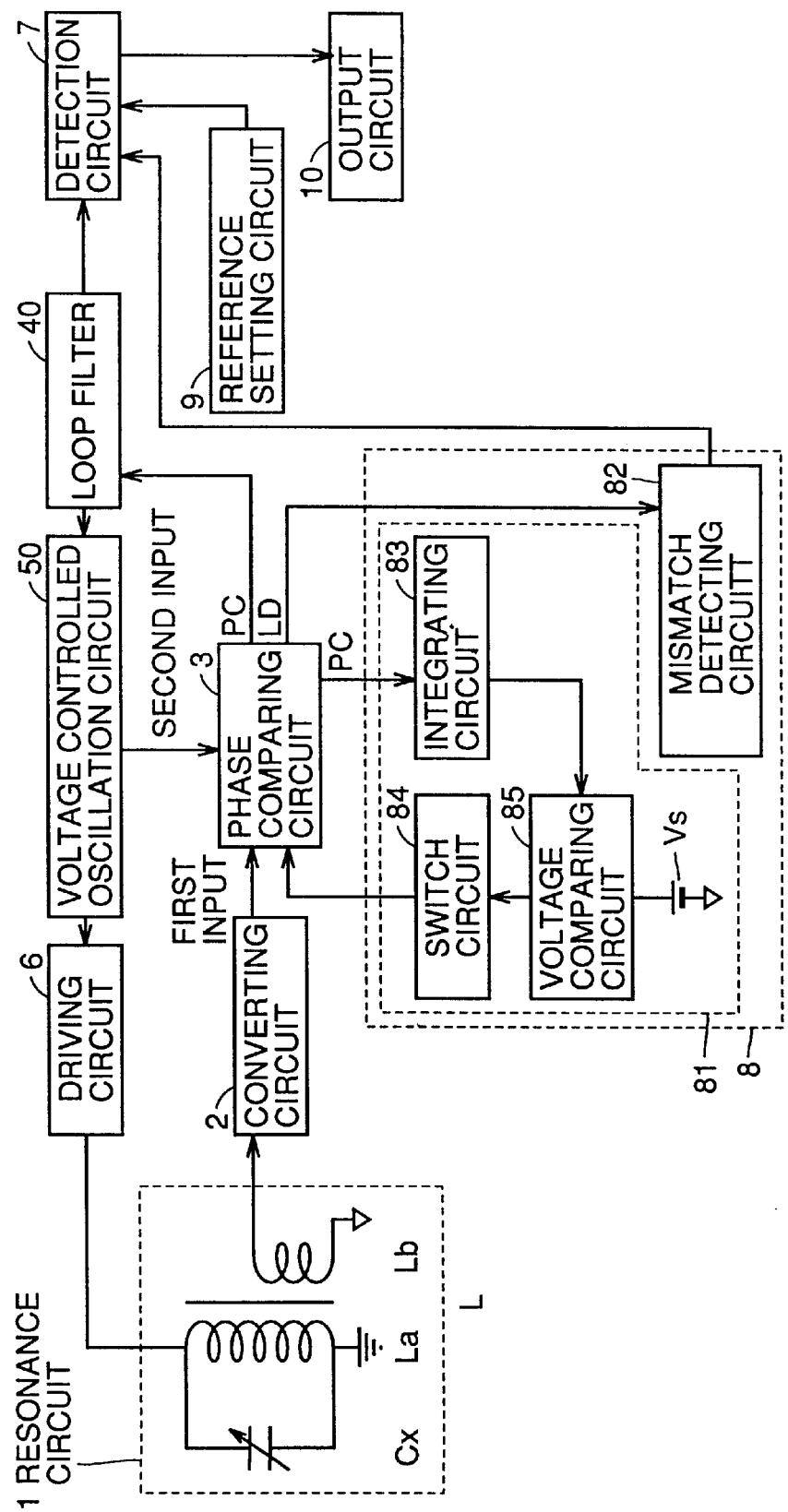
FIG. 6 is a more specific block diagram of an embodiment of the present invention.

FIG. 2 shows an appearance of the capacitance type detector in accordance with an embodiment of the present invention. Referring to FIG. 2, a columner lower measurement electrode 22 corresponds to the electrode plate 102 shown in FIGS. 3A and 3B. An upper measurement electrode 22 and an insulator 23 are arranged coaxially, separated by a cylindrical insulator to be not in contact with the cylindrical upper measurement electrode 22. One end of upper electrode 22 is attached to a protective frame 25 by means of a fitting 24. In the protective frame 25, a circuit portion 26 such as shown in FIGS. 1 and 6, which will be described later, is provided. Circuit portion 26 contains the resonance transformer shown in FIG. 4.

FIG. 1 is a block diagram of one embodiment of the present invention. Referring to FIG. 1, resonance circuit 1 is formed of a parallel circuit including a capacitance component Cx formed between electrode body 102 and the object of detection 101 and a resonance transformer L, as already described with reference to FIG. 4. The resonance transformer L includes an inductance component La of a primary coil and an inductance component Lb of a secondary coil.

An output of the secondary coil Lb of resonance transformer L in the resonance circuit 1 is converted to a signal suitable for the succeeding stage by a converting circuit 2, and applied to a first input end of a phase comparing circuit 3. Phase comparing circuit 3 compares phases of an output signal output from resonance circuit 1 and a reference signal output from variable frequency generating circuit 5, and outputs a phase difference signal corresponding to the phase difference. The phase difference signal is applied to a control circuit 4 and a phase difference determining circuit 8. Control circuit 4 applies a control signal to variable frequency generating circuit 5 and to a detection circuit 7 so as to eliminate the phase difference between the output signal output from resonance circuit 1 and the reference signal output from the variable frequency generating circuit 5, in accordance with the phase difference signal.

Variable frequency generating circuit 5 generates an oscillation signal of which oscillation frequency is in accordance with the control signal, and applies the oscillation signal as a reference signal to phase comparing circuit 3 and driving circuit 6. Driving circuit 6 drives the resonance circuit 1 with the oscillation signal. Phase difference determining circuit 8 determines presence/absence of phase difference between the resonance frequency of resonance circuit 1 and the oscillation frequency of variable frequency generating circuit 5, based on the phase difference signal applied from a second input end of phase comparing circuit 3, and when there is generated a phase difference as described with reference to FIGS. 5A and 5B, applies the determination signal to the second input end of phase comparing circuit 3 and to the detection circuit 7.

A reference value is applied to the detecting circuit 7 from a reference setting circuit 9. Detection circuit 7 compares the control signal from control circuit 4 with the reference value set by the reference setting circuit. The reference value is, for example, a value representing the deposition level shown in FIGS. 3A and 3B. Namely, when the control signal is not lower than the reference value, a non-detection signal indicating the state of FIG. 3A is output, and when the control signal is lower than the reference value, a detection signal representing the state of FIG. 3B is output. When a detection signal is applied from detection circuit 7, output circuit 10 outputs a signal indicating that the level has reached the deposition level. Therefore, it can be detected that the object of detection has reached the deposition level.

FIG. 6 is a most specific block diagram of an embodiment of the present invention. The embodiment shown in FIG. 6 is the same as that of FIG. 1 except the following points. Namely, a voltage controlled oscillating circuit (VCO) 50 is used as the variable frequency generating circuit 5. The voltage controlled oscillation circuit 50 is capable of oscillation at a frequency from free-running frequency fmin to a maximum frequency fmax. A loop filter 40 is used in place of control circuit 4 of FIG. 1. Phase difference determining circuit 8 includes a reset circuit 81 and a mismatch detecting circuit 82.

Reset circuit 81 sets the oscillation frequency of voltage controlled oscillation circuit 50 at the lowest frequency within the variable frequency range, and it includes an integrating circuit 83, a switch circuit 84 and a voltage comparing circuit 85. Integrating circuit 83 is formed of the same circuit as loop filter 40, and it converts a phase difference signal PC output from phase comparing circuit 3 to a DC voltage and applies it to the first input end of voltage comparing circuit 85. A reference voltage set to a DC voltage Vs, which corresponds to a frequency fs slightly lower than the DC voltage Vmax corresponding to the maximum frequency fmax of voltage controlled oscillation circuit 50, is input to the second input end of voltage comparing circuit 85. When the DC voltage as the output of integrating circuit 83 exceeds the reference voltage Vs, voltage comparing circuit 85 renders switch circuit 84 conductive. When switch circuit 84 is rendered conductive, the first input end of phase comparing circuit 3 is short-circuited, and therefore, input of the resonance signal from resonance circuit 1 output through converting circuit 2 to the first input end of phase comparing circuit 3 is inhibited.

In a mismatch state where the voltage controlled oscillation circuit 50 does not follow the resonance frequency of resonance circuit 1, that is, when the phase comparing signal LD output from phase comparing circuit 3 indicates a mismatch state, mismatch detecting circuit 82 prevents detection of the control signal output from loop filter 40 by the detection circuit 7.

Figure 7:
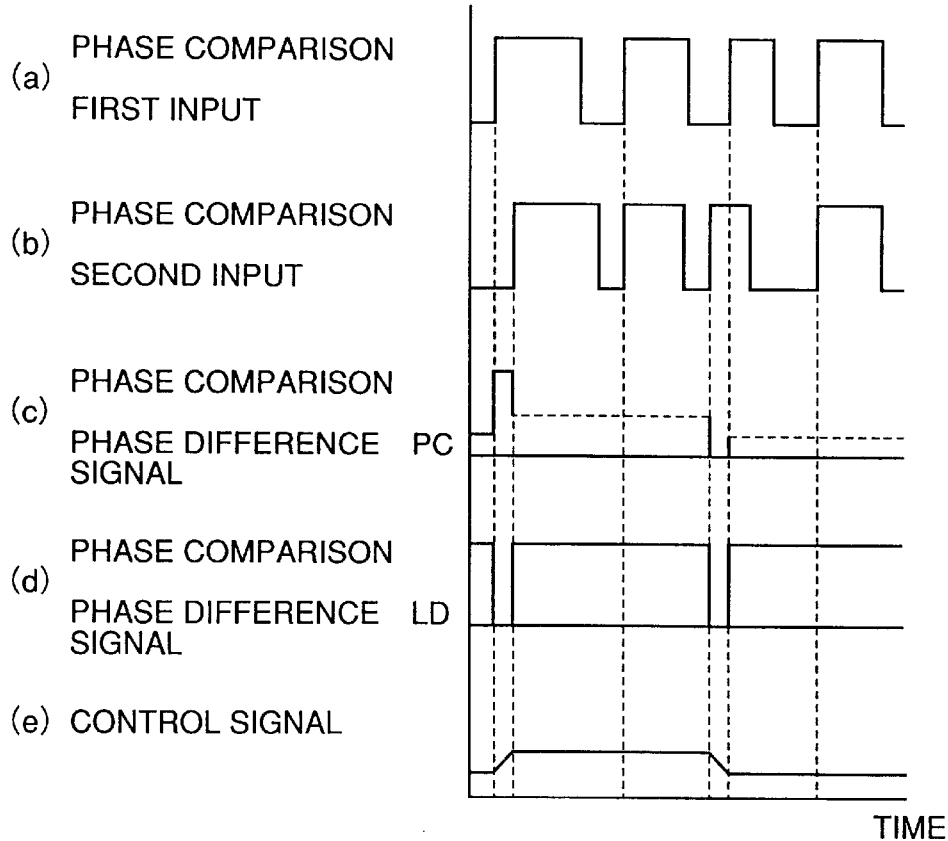
FIG. 7 is a time chart representing the operation of the phase comparing circuit.
Figure 8:
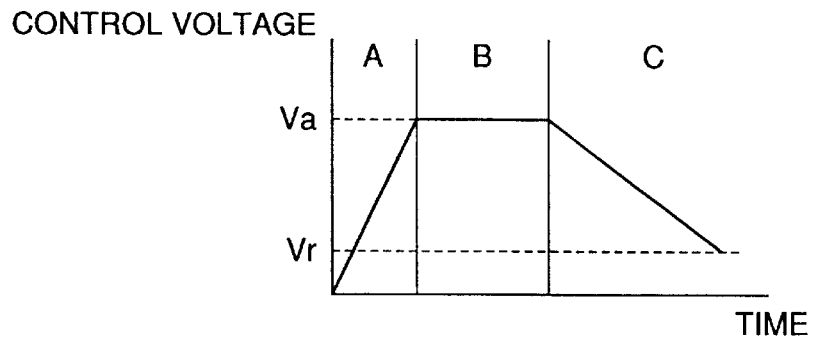
FIG. 8 shows time change of the control voltage.
Figure 9A:
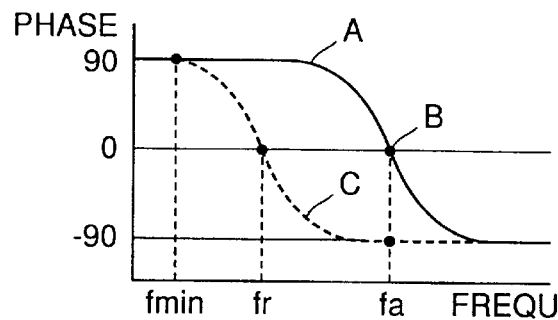
FIGS. 9A and 9B represent the relation between the oscillation frequency and the control signal when the resonance frequency of the resonance circuit changes.
Figure 9B:
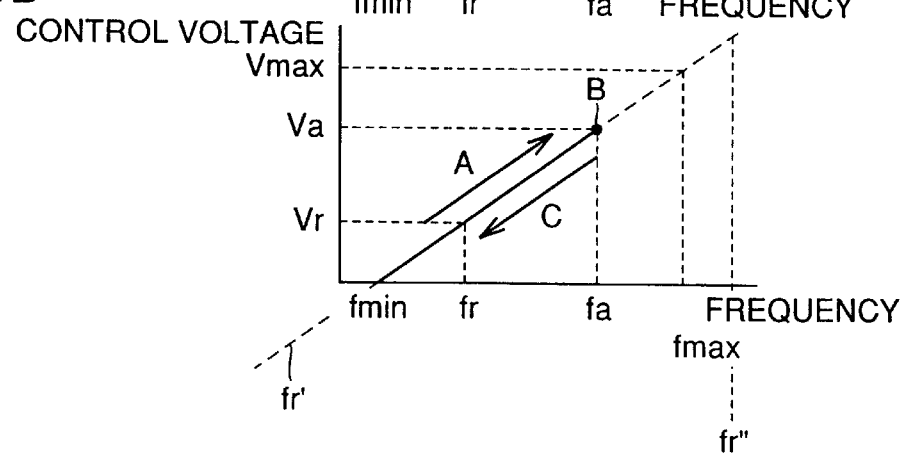
Figure 10:
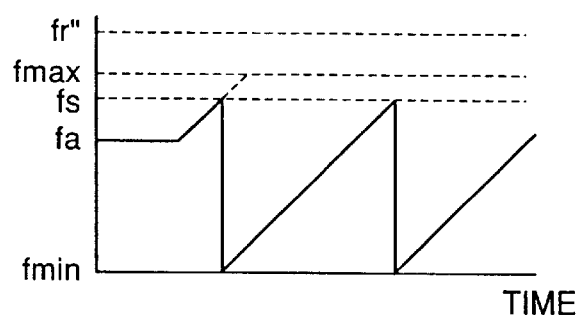
FIG. 10 is a graph representing change in the resonance frequency with time, when the resonance frequency of the resonance circuit exceeds the variable frequency range of the variable frequency generating circuit.

FIG. 7 is a time chart representing the operation of the phase comparing circuit, FIG. 8 shows time change of the control voltage, FIGS. 9A and 9B show the relation between the oscillation frequency and the control signal when the resonance frequency of the resonance circuit changes, and FIG. 10 is a graph representing time change of the resonance frequency when the resonance frequency of the resonance circuit exceeds the variable frequency range of the variable frequency generating circuit.

More specific operation of the embodiment of the present invention will be described with reference to FIGS. 6 to 10. When the capacitance type detector in accordance with the present invention is placed in a container 100 with the object of detection 101 not present, as shown in FIG. 3A and the power is turned on, calibration is performed automatically. More specifically, immediately after the power on, loop filter 40 does not generate any control signal, the voltage controlled oscillation circuit 50 starts oscillation at a free-running frequency fmin of itself regardless of the resonance frequency fa of resonance circuit 1, and applies such an oscillation signal as shown in FIG. 7(b) to the second input end of the phase comparing circuit 3 and to the driving circuit 6. Driving circuit 6 power-amplifies the oscillation signal to be sufficient to drive the resonance circuit 1, and applies the amplified oscillation signal to resonance circuit 1.

When the oscillation signal oscillating at the free-running frequency fmin of voltage controlled oscillation circuit 50 is input by the driving circuit 6, resonance circuit 1 shifts the phase of the oscillation signal in correspondence with the frequency difference between the free-running frequency fmin and the resonance frequency fa, and outputs the resulting signal to converting circuit 2. Converting circuit 2 converts the signal such that only the phase component is adapted to be handled by the phase comparing circuit 3 so that dielectric constant of the object of detection is not related to the amplification voltage of the resistance component, and applies the signal shown in FIG. 7(a) to the first input end of phase comparing circuit 3. Phase comparing circuit 3 compares phases of the signal having the frequency of fmin applied from resonance circuit 1 through converting circuit 2 to the first input end and of the signal having the frequency fmin directly applied to the second input end from the voltage controlled oscillation circuit 50, and outputs a phase difference signal PC shown in FIG. 7(c) that corresponds to the phase difference to loop filter 40.

Loop filter 40 integrates the phase difference signal PC, converts to a DC voltage, and outputs the result to voltage controlled oscillation circuit 50 and detection circuit 7. This operation is repeated and when the phase difference is eliminated, that is, when the oscillation signal of voltage controlled oscillation circuit 50 matches the resonance frequency fa of resonance circuit 1, the control voltage attains to a constant voltage Va as shown in FIG. 8, and this state is maintained.

This state where the oscillation signal of voltage controlled oscillation circuit matches the resonance frequency of resonance circuit 1, represents completion of automatic calibrating operation. Therefore, unlike the conventional practice requiring a manual operation for calibration, calibration starts automatically when the power is turned on. This state can be attained and completed instantaneously.

After the above described automatic calibration, measurement operations starts and the object of detection 101 is detected. More specifically, when the object of detection 101 comes close to or in contact with electrode body 102 as shown in FIG. 3B and resonance frequency fa of resonance circuit 1 changes to a frequency fr within a range (capture range) that can be followed by voltage controlled oscillation circuit 50 shown in FIG. 9B, there is a phase deviation corresponding to the difference in frequency, as the oscillation signal of voltage controlled oscillation circuit 50 has the frequency fa. More specifically, the first and the second inputs of phase comparing circuit 3 are as shown in (a) and (b) of FIG. 7, with a phase difference therebetween. Therefore, phase comparing circuit 3 outputs the phase difference signal PC of FIG. 7(c) and the phase difference signal LD of FIG. 7(d). In the period in which phase difference signal LD is at the "H" level, the resonance frequency of resonance circuit 1 is followed by voltage controlled oscillation circuit 50, which state will be referred to as matching state. When the control voltage output from loop filter 40 changes from Va to Vr by phase difference signal PC, voltage controlled oscillation circuit 50 operates such that the frequency of oscillation signal matches fr.

Detection circuit 7 compares the voltage Vr supplied from loop filter 40 with the reference value Vc of reference setting circuit 9, and when Vr<Vc holds, the detection circuit outputs a detection signal to output circuit 10. The reason for this is as follows. In calibration, the frequency is defined by the dielectric constant in the air within the container, and the voltage output from loop filter 40 is high. The object of detection 101 has the dielectric constant higher than that of the air, so that the frequency becomes lower and the voltage output from loop filter 40 becomes lower than in the calibrating operation. Output circuit 10 externally outputs or indicates detection of the object 101 by the detection signal.

When the object of detection 101 comes close to or in contact with the electrode body and the operable range of voltage controlled oscillation circuit 50 becomes lower than the range (capture range) that can be followed as represented by fr' of FIG. 9B of resonance frequency of resonance circuit 1, there would be a phase deviation corresponding to the frequency difference, as the oscillation frequency of voltage controlled oscillation circuit 50 has the frequency of fa. Phase comparing circuit detects the phase deviation, and changes the control voltage as the output of loop filter 40. When the DC voltage Va of the output decreases as shown in the portion C of FIG. 8, the frequency of the oscillation signal from voltage controlled oscillation circuit 50 also decreases. The oscillation frequency of voltage controlled oscillation circuit 50 cannot be set to fr' even when the control voltage of the output of loop filter 40 attains to the minimum value 0V, oscillation frequency is fixed at fmin, which corresponds to the control signal.

Detection circuit 7 compares the control voltage and the reference voltage Vc, and as the control voltage is lower than the reference voltage Vc, outputs a detection signal of the object 101 to output circuit 10. Output circuit 10 externally outputs or indicates detection of object 101, by the detection signal.

When the object of detection 101 comes close to or brought into contact with electrode body 102 and the resonance frequency of resonance circuit 1 exceeds the range (capture range) that can be followed by voltage controlled oscillation circuit 50 as shown by fr" of FIG. 9B, there is generated a phase deviation corresponding to the frequency difference, as the oscillation signal of voltage controlled oscillation circuit 50 has the frequency fa.

The phase comparing circuit 3 detects the phase deviation, increases the control voltage of the output of loop filter 40 from Va, and increases the frequency of the oscillation signal of voltage controlled oscillation circuit 50. The resonance frequency fr" is higher than the upper limit fmax of the oscillation signal as shown in FIG. 10, and hence, matching cannot be attained and the oscillation signal is fixed at fmax.

Accordingly, the reset circuit 81 is provided for setting the oscillation frequency of voltage controlled oscillation circuit 50 to the lowest frequency of the variable frequency range. The reset circuit 81 includes an integrating circuit 83, a voltage comparing circuit 85 and a switch circuit 84. The phase difference signal PC is converted to a DC voltage by the integrating circuit 83 of reset circuit 81, and input to the first input of voltage comparing circuit 85. A reference voltage set at a voltage Vs that corresponds to a frequency fs slightly lower than the DC signal Vmax responding to fmax is input to the second input end of voltage comparing circuit 85. When the DC voltage of integrating circuit 83 exceeds the reference voltage Vs, voltage comparing circuit 85 renders switch circuit 84 conductive.

When switch circuit 84 is rendered conductive, the first input end of phase comparing circuit 3 is short-circuited, and hence the resonance signal of resonance circuit 1 is not input. Therefore, the signal to be compared is lost in the phase comparing circuit 3, and the phase comparing circuit sets the phase difference signal PC to 0V as shown in FIG. 7(c). As the phase difference signal PC attains to 0V, the control voltage at the output of loop filter 40 attains to 0V. As a result, the voltage controlled oscillation circuit 50 is initialized and the frequency of the oscillation signal is set to fmin. As the DC voltage of integrating circuit 83 in reset circuit 81 also attains to 0V, lower than the reference voltage Vs, voltage comparing circuit 85 renders switch circuit 84 non-conductive, so that the resonance signal of resonance circuit 1 is supplied to the first input end of phase comparing circuit 3.

Thereafter, the above described operations of phase comparison, increase of the control signal, increase of the frequency of the resonance signal . . . are repeated.

While the above described operations are repeated, the oscillation frequency of variable frequency generating circuit 5 does not follow the resonance frequency of resonance circuit 1, and therefore, the state is a mismatch state. Therefore, phase comparing circuit 3 outputs the phase difference signal LD of FIG. 7(d) as a mismatch signal, to mismatch detecting circuit 82. In response to the application of the mismatch signal, the mismatch detecting circuit 82 prevents the control signal as the output of loop filter 40 from being detected by the detection circuit 7. Thus, the output signal of detection circuit 7 is fixed to the state detecting the object 101.

When the state of the object 101 changes and the resonance frequency of resonance circuit 1 moves to be within the capture range, for example, to fr as shown in FIG. 9B, voltage controlled oscillation circuit 50 is tuned with the oscillation signal matching the resonance frequency fr of resonance circuit 1, and the control signal comes to have the voltage Vr, by the similar operation when "the object comes close to or in contact with the electrode body and the resonance frequency of resonance circuit 1 changes to a frequency fr within a range (capture range) that can be followed by voltage controlled oscillation circuit 50."

The DC signal of integrating circuit 83 is lower than the reference voltage Vs of reset circuit 81, and therefore switch circuit 84 of reset circuit 81 is maintained at the non-conductive state.

Further, as the phase comparing circuit 3 outputs the match signal as the phase difference signal LD when the oscillation signal is tuned with fr, mismatch detecting circuit 82 allows the control signal from loop filter 40 to enter the detection circuit 7. Detection circuit 7 determines the control signal, and the detection signal of the object 101 is output to output circuit 10.

As described above, according to the embodiment of the present invention, calibration can automatically be performed at the time of power on, followed by the operation of measuring presence/absence of the object of detection.

Figure 11:
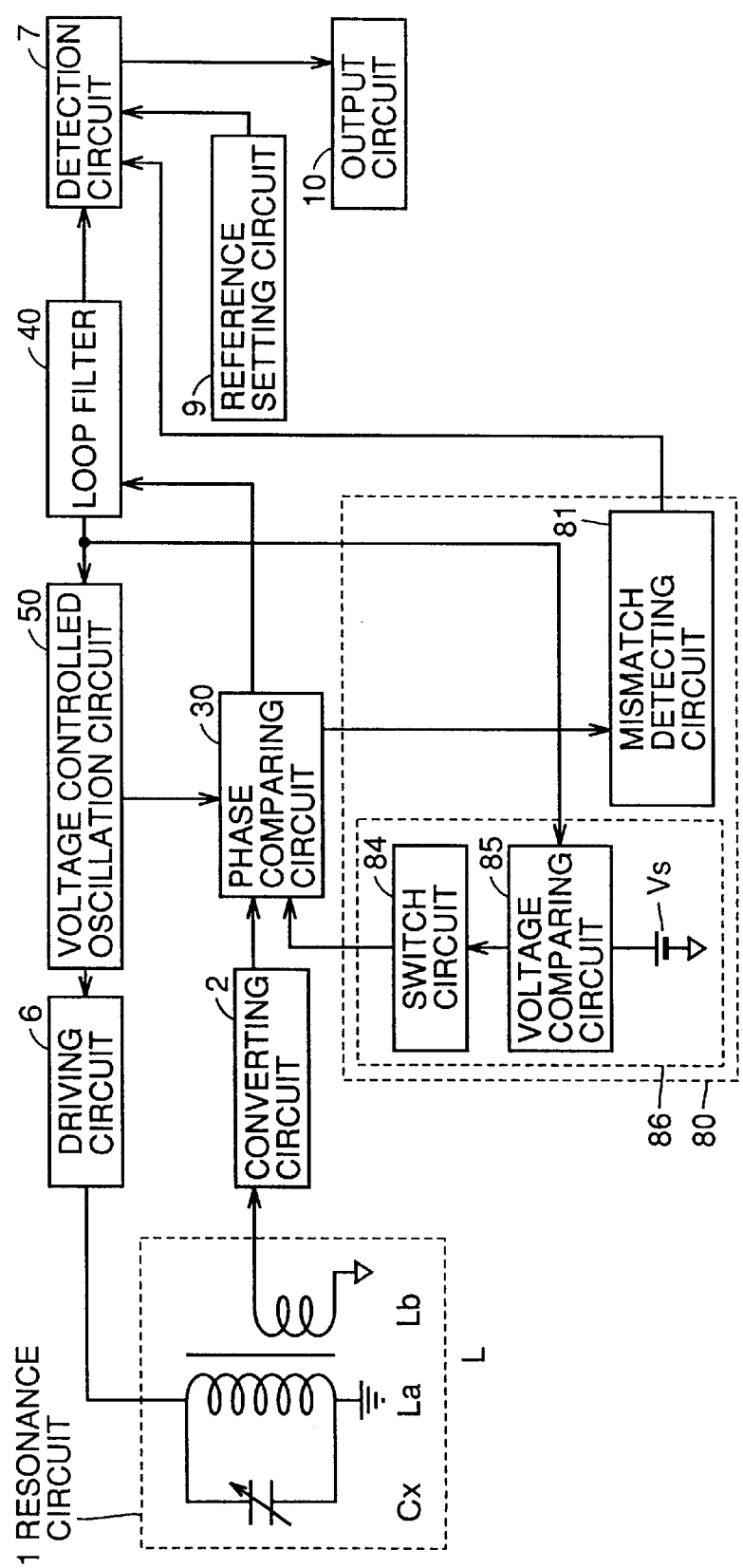
FIG. 11 is a block diagram of another embodiment of the present invention.

FIG. 11 is a block diagram of another embodiment of the present invention. In the embodiment shown in FIG. 11, loop filter 40 also serves as integrating circuit 83 shown in FIG. 6, so that integrating circuit 83 is omitted and the number of components is reduced. Therefore, reset circuit 86 is formed by switch circuit 84 and voltage comparing circuit 85, with the output signal of loop filter 40 applied to the second input end of voltage comparing circuit 85.

As the specific operation of the embodiment shown in FIG. 11 is the same as that described with reference to FIG. 5, description thereof will not be repeated.

Figure 12:
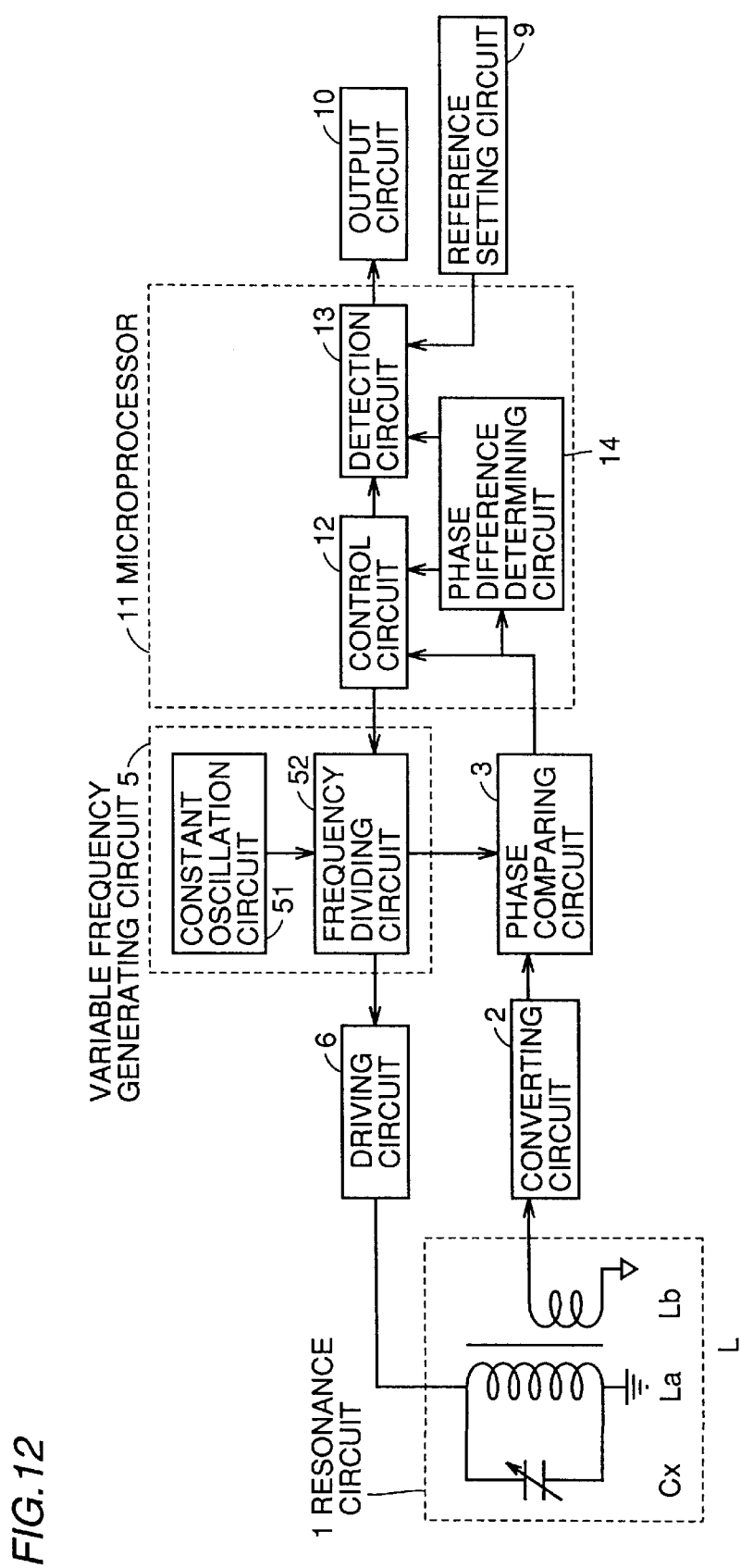
FIG. 12 is a block diagram showing a further embodiment of the present invention.

FIG. 12 is a block diagram representing a still further embodiment of the present invention. In the embodiment shown in FIG. 12, variable frequency generating circuit 5 is constituted by a constant oscillation circuit 51 and a frequency dividing circuit 52, and control circuit 12, a detection circuit 13 and a phase difference determining circuit 14 are constituted by a microprocessor 11. Microprocessor 11 detects an output signal of phase comparing circuit 3, and controls division ratio of frequency dividing circuit 52 of variable frequency generating circuit 5.

Here, microprocessor 11 sets, in advance, frequency division ratios bmax and bmin of frequency dividing circuit 52 corresponding to the upper and lower limits of the variable frequency of variable frequency generating circuit 5. Constant oscillation circuit 51 oscillates at a prescribed oscillation frequency, and outputs a signal to frequency dividing circuit 52. Frequency dividing circuit 52 applies an oscillation signal provided by frequency-dividing the signal from constant oscillation circuit 51 through the driving circuit 6 to resonance circuit 1 in accordance with the initialized division ratio, for example, bfmin, set in microprocessor 11, and at the same time, applies the signal to the second input end of phase comparing circuit 3. The signal with its phase changed by resonance circuit 1 is applied to the first input end of phase comparing circuit 3 through converting circuit 2.

Phase comparing circuit 3 compares the signals at the first and second input ends and when there is a phase difference, generates a falling pulse signal such as shown in FIG. 7(d) on phase difference signal LD, and outputs to microprocessor 11. In the presence of the pulse signal, microprocessor 11 successively changes the division ratio such that it repeats monotonous increase from the lower limit to the upper limit, for example, to increase frequency of the oscillation signal.

When the resonance frequency of the resonance circuit matches the oscillation frequency, phase comparing circuit 3 does not generate a pulse signal on phase difference signal LD. Therefore, at a time point when the pulse signal disappears, microprocessor 11 fixes the division ratio of frequency dividing circuit 52, fixing the oscillation signal at a value matching the resonance frequency of the resonance circuit 1, and stores a value corresponding to the division ratio.

When the resonance frequency of resonance circuit 1 changes to fr in accordance with the state of the object of detection 101, microprocessor 11 fixes the oscillation frequency matching fr by the similar operation as described above, and stores the value corresponding to the division ratio at that time. Microprocessor 11 compares the stored value with the reference value obtained from reference value setting circuit 9, and outputs a detection state signal of the object to output circuit 10. When the resonance frequency of resonance circuit 1 goes out of the frequency variable range (fr', fr"), microprocessor 11 continuously changes the frequency defined by the upper and lower limits of the division ratio such that monotonous increase is repeated, in a prescribed repetition, and during this period, provide the detection state signal of the object to output circuit 10.

As to the upper and lower limits set in advance described above, the entire variable frequency range may be swept by microprocessor 11 at the time of power on and the upper and lower limits of the division ratio of frequency dividing circuit 52 may be set so that the resonance frequency of resonance circuit 1 becomes the central value of the variable frequencies, and the set upper and lower limits may be stored.

Figure 13:
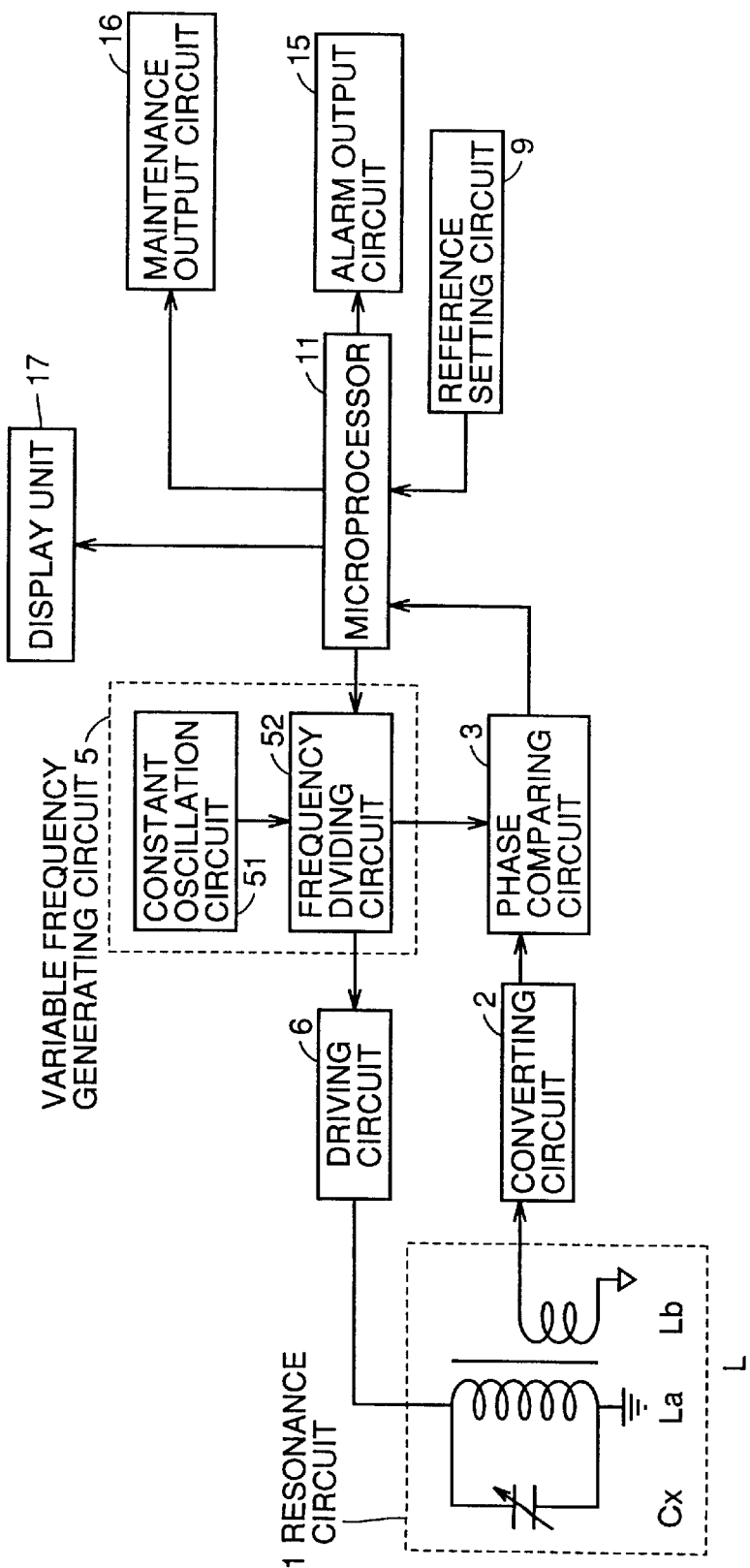
FIG. 13 is a block diagram showing a still further embodiment of the present invention.

FIG. 13 is a block diagram showing a still further embodiment of the present invention. The embodiment shown in FIG. 13 includes an alarm output circuit 14, a maintenance output circuit 15 and a display unit 16 additionally provided on microprocessor 11 of FIG. 12. Alarm output circuit 15 outputs an alarm signal when the object of detection 101 adheres by a prescribed amount or more on the electrode body 102. Maintenance output circuit 15 outputs a signal requesting maintenance in the similar manner. Display unit 16 is implemented by a LCD display, for example. The display unit displays in 8 steps, the change in frequency (corresponding to the change in capacitance) between the state of FIG. 3A where the object of detection 101 does not exist in container 100 and the state where the object of detection 101 has reached the deposition level. The display function may be used to display the amount of object adhered on the electrode, and hence erroneous operation caused by the adhesion can be avoided by checking the display. Further, when the degree of adhesion is set, the time for cleaning the electrode portion may be output.

Figure 14:
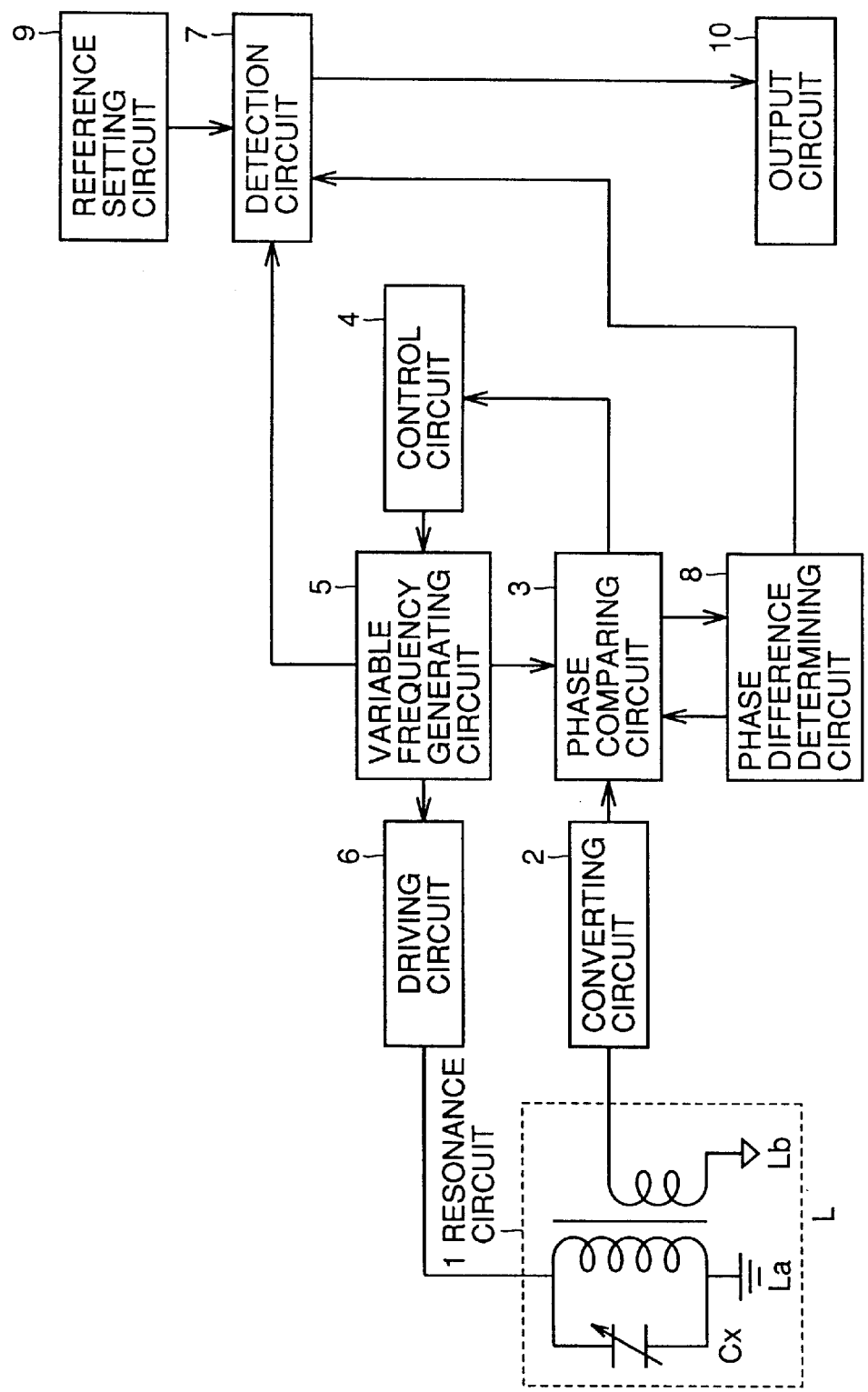
FIG. 14 is a block diagram showing a still further embodiment of the present invention.

FIG. 14 is a block diagram showing a still further embodiment of the present invention.

In the embodiment shown in FIG. 1 described above, when the object of detection 101 has reached the deposition level or not is detected by comparing the control voltage output from control circuit 4 with the reference value. By contrast, in the present embodiment, whether the object of detection 101 has reached the deposition level or not is detected by comparing the frequency of the oscillation signal output from variable frequency generating circuit 5 with the reference value set by the reference setting circuit 9, by detection circuit 7. Except this point, the configuration is the same as that of FIG. 1.

Comparison between the frequency signal and the reference value by detection circuit 7 is advantageous in that dynamic range can be made larger than when the control voltage is compared with the reference value.

In addition, in the embodiment shown in FIG. 1, temperature characteristic when the phase difference signal from phase comparing circuit 3 is converted to the control voltage has significant influence, whereas in the example shown in FIG. 14, the signal purely in accordance with the resonance frequency of resonance circuit 1 is compared with the reference value, and therefore, influence of temperature characteristic can be reduced.

Figure 15:
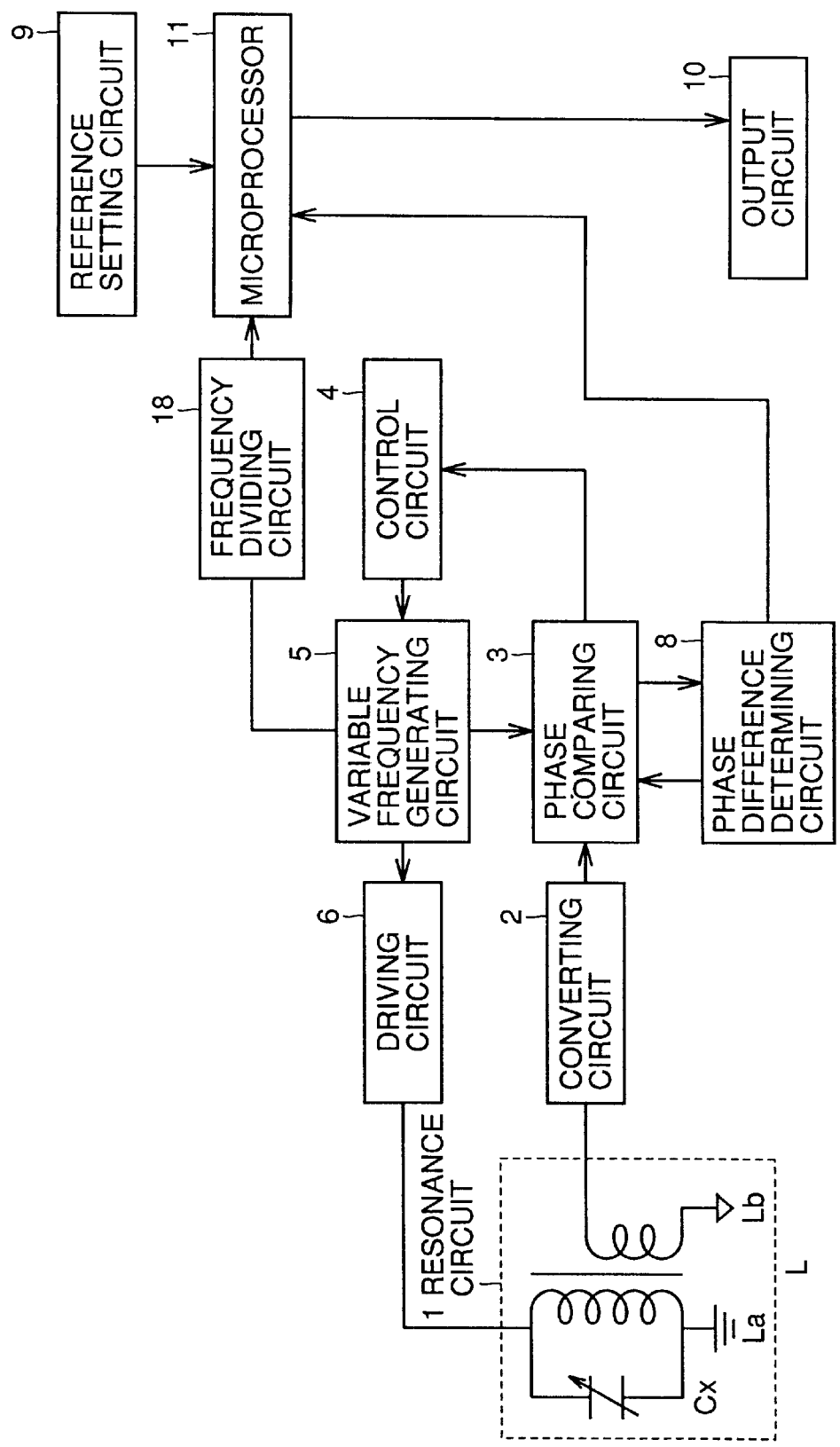
FIG. 15 is a block diagram showing a still further embodiment of the present invention.

FIG. 15 is a block diagram showing a still further embodiment of the present invention.

In the embodiment shown in FIG. 14, presence/absence of the object of detection is detected by comparing the frequency signal from variable frequency generating circuit 5 with the reference value. In the present embodiment, the frequency signal from variable frequency generating circuit 5 is applied to a frequency dividing circuit 18 and frequency-divided, and the resulting value is compared with the reference value by a microprocessor 11 to detect presence/absence of the object of detection.

Figure 16:
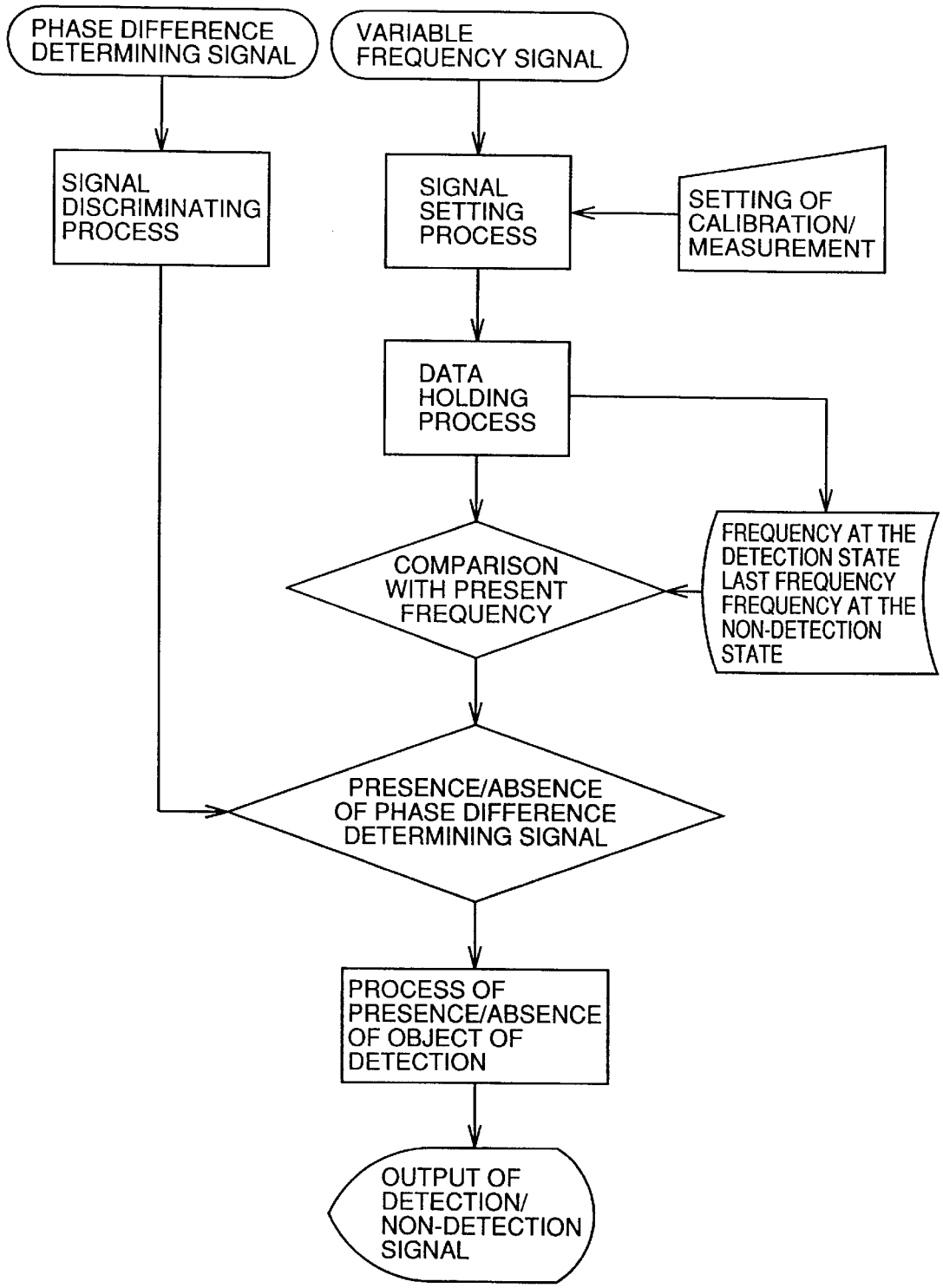
FIG. 16 is a flow chart representing an operation of the microprocessor shown in FIG. 15.

FIG. 16 is a flow chart representing the operation of the microprocessor shown in FIG. 15.

Referring to FIG. 16, the operation of the capacitance type detector shown in FIG. 15 will be described.

First, before the measurement, the following setting is done. The frequency signal from variable frequency generating circuit 5 is divided by frequency dividing circuit 18 and the result is applied to microprocessor 11. The phase difference signal is applied from phase difference determining circuit 8 to microprocessor 11. Further, by communication with a personal computer or an operation of a push switch, not shown, whether it is a calibration in the state of FIG. 3A where the object of detection 101 is not detected or a measurement in the detection state of FIG. 3B, is set in microprocessor 11.

In response to the setting of calibration/measurement, microprocessor 11 performs a signal setting process, determining whether the input signal is at a frequency for the calibration at the non-detection state, or the frequency at the detection state in the measurement operation. Namely, when calibration is set, the oscillation frequency of variable frequency generating circuit 5 is made equal to the resonance frequency of resonance circuit 1 to attain signal setting for calibration, in the similar manner as described with reference to FIG. 6. At this time, the object of detection 101 does not exist in the container, and therefore, a frequency determined by the dielectric constant in the air is set.

When the measurement operation is set, the object of detection 101 is put in the container, and the frequency in accordance with the amount of deposition of the object is set. Microprocessor 11 performs a data holding process for holding the frequency of non-detection time (for calibration) set by the signal setting process and the frequency at the time of detection (in accordance with the amount of deposition of the object 101) in a data holding memory such as an EEPROM.

In the actual measurement, microprocessor 11 compares the present frequency data oscillated by the variable frequency generating circuit 5 and frequency-divided by frequency dividing circuit 18 with the frequency data held in the data holding process. When the result of comparison is "frequency of non-detection state>frequency of detection state≧present frequency", then a detection signal is output. When "present frequency>frequency of detection state", then a non-detection signal is output. The reason for this is as follows. At non-detection state, the frequency is high, as it is defined by the dielectric constant in the air, while the dielectric constant of the object of detection 101 is higher than that in the air. Therefore, the frequency becomes lower when the object 101 is detected. More specifically, when the present frequency becomes lower than the set frequency of detection state, microprocessor 11 determines that there is the object 101.

A frequency higher than the frequency of the detection state is obtained as the present frequency, if the frequency at the detection state is not lower than this value, it means that a substance having a dielectric constant smaller than the air is detected. As such a substance does not exist, it can be regarded as a malfunction or mis-adjustment of frequency.

A phase difference determining signal is output from phase difference determining circuit 8 to microprocessor 11, and by a signal discriminating process, the signal is converted to a signal exceeding a prescribed threshold level (a signal without chattering, for example). A signal representing presence/absence of the phase difference is compared with the present frequency signal, and when the phase difference determining signal indicates presence of a phase difference, a detection signal is output regardless of the comparison between the present frequency and the held data. When the phase difference determining signal represents absence of the phase difference, a non-detection or detection signal is output as the result of comparison between the present frequency and the held data.

A signal is output in accordance with a setting as to whether an output signal is to provided at the detection state or an output signal is to be provided at the non-detection state. Further, a delay timer may be provided to provide a delay time on the output signal, so that a detection signal and a non-detection signal should not be output alternately if the determination as to detection and non-detection is delicate.

Further, as to the comparison with the present frequency, not only simple comparison of frequency but the following operation may be possible. Namely, the difference between the frequency of the non-detection state and the frequency of the detected state is equally divided, and by determining at which position the present frequency corresponds, it becomes possible to provide hysteresis between detection and non-detection. Further, comparison with the last frequency may be helpful to reduce influence of noise.

As described above, according to the embodiment of the present invention, a loop is formed by the resonance circuit, the driving circuit, the phase comparing circuit and the variable frequency generating circuit, the resonance frequency of the resonance circuit is searched at the time of power on and the electrode body is operated at the resonance frequency. Therefore, manual calibration by the operator at the site becomes unnecessary, and therefore error caused by manual operation can be prevented and efficiency of working can be improved.

Further, as the resonance frequency of the resonance circuit is used for the detecting operation, variation in detection sensitivity can be suppressed.

Further, even when the resonance frequency of the resonance circuit exceeds the range (capture range) that can be followed by the variable frequency generating circuit because of the object of detection, the detector is usable, and hence the detector can be used under wide variety of conditions.

Further, it is operated at the resonance frequency of the resonance circuit and the object is detected by a control signal or the like corresponding to the frequency, and hence it is less susceptible to the influence of conductivity of the object.

Further, a parallel resonance circuit is used as the resonance circuit, ensuring low impedance relative to static electricity, and hence, electrostatic resistance characteristic can be improved.

Further, as the variable frequency generating circuit is used as the frequency generating circuit of the first and second inputs of the phase comparing circuit, the pre-oscillation circuit becomes unnecessary, and hence the cost can be reduced and the ratio of malfunction can be reduced.

Further, a common circuit portion can be utilized, including rating of the components, implementation by an IC, for example, is possible, which leads to reduced manufacturing cost.

Further, as a common circuit portion is used, spare parts to be ready at the site can be reduced, and hence overall cost can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A capacitance type detector detecting a level of an object of detection in accordance with a capacitance of the object in a container, comprising:

an electrode body inserted to said container;

a resonance circuit including a capacitance formed between said electrode body and said object of detection, and a resonance transformer to be tuned therewith;

a phase comparing circuit comparing phases of an output signal of said resonance circuit and a reference signal, and outputting a phase difference signal in accordance with the phase difference;

a control circuit outputting a control signal to eliminate said phase difference, in response to said phase difference signal from said phase comparing circuit;

a variable frequency generating circuit generating a frequency signal of an oscillation frequency in accordance with the control signal from said control circuit, and applying the frequency signal to said phase comparing circuit as said reference signal and to said electrode body;

a reference value setting circuit setting a reference value for determining detection of said object of detection;

a detection circuit comparing the control signal output from said control circuit or the frequency signal output from said variable frequency generating circuit with the reference value set by said reference value setting circuit and outputting a detection signal;

an output circuit outputting a signal representing presence/absence of said object of detection in accordance with the detection signal of said detection circuit; and a phase difference determining circuit responsive to the phase difference signal output from said phase comparing circuit, determining phase difference between the resonance frequency of said resonance circuit and the oscillation frequency of said variable frequency generating circuit, and in response to determination of presence of a phase difference, operating said phase comparing circuit such that the oscillation frequency of said variable frequency generating circuit follows the resonance frequency of said resonance circuit.

2. The capacitance type detector according to claim 1, wherein said phase difference determining circuit includes a reset circuit for setting, when the phase difference signal output from said phase comparing circuit attains to or exceeds a prescribed value, the frequency signal of said variable frequency generating circuit to a lowest frequency of a frequency variable range of said variable frequency generating circuit, and a mismatch detecting circuit comparing the phase of the oscillation frequency of said variable frequency generating circuit with the phase of the resonance frequency of said resonance circuit, and outputting a detection signal from said detection circuit when the phases do not match.

3. The capacitance type detector according to claim 2, wherein said reset circuit includes an integrating circuit integrating a phase difference signal output from said phase comparing circuit, a voltage comparing circuit comparing an integration signal from said integrating circuit with a prescribed voltage value, and a switching circuit responsive to a determination that said integration signal is not lower than said prescribed voltage value by said voltage comparing circuit, setting the oscillation frequency of said variable frequency generating circuit to said lowest frequency.

4. The capacitance type detector according to claim 1, wherein said phase difference determining circuit makes the oscillation frequency of said variable frequency generating circuit follow the resonance frequency of said resonance circuit at the time of power on.

5. The capacitance type detector according to claim 1, wherein said control circuit includes a loop filter.

6. The capacitance type detector according to claim 1, wherein said variable frequency generating circuit includes a voltage controlled oscillation circuit.

7. The capacitance type detector according to claim 1, wherein said variable frequency generating circuit includes a constant oscillation circuit generating a constant frequency signal, and a frequency dividing circuit having a division ratio variably set in accordance with a control signal from said control circuit, and frequency-dividing the frequency signal generated from said constant oscillation circuit with the set division ratio and outputting a result.

8. The capacitance type detector according to claim 1, wherein said control circuit, said detection circuit and said phase difference determining circuit are implemented by a microprocessor.

9. A capacitance type detector detecting a level of an object of detection in accordance with a capacitance of the object in a container, comprising:

an electrode body inserted to said container;

a resonance circuit including a capacitance formed between said electrode body and said object of detection, and a resonance transformer to be tuned therewith;

a phase comparing circuit comparing phases of an output signal of said resonance circuit and a reference signal, and outputting a phase difference signal in accordance with the phase difference;

a control circuit outputting a control signal to eliminate said phase difference, in response to the phase difference signal from said phase comparing circuit;

a variable frequency generating circuit generating a frequency signal of an oscillation frequency in accordance with the control signal from said control circuit, applying the frequency signal to said phase comparing circuit as said reference signal, and applies to said electrode body;

a reference value setting circuit setting a reference value for determining detection of said object;

a detection circuit comparing the control signal output from said control circuit and the reference value set by said reference value setting circuit, and outputting a detection signal representing presence/absence of said object of detection;

display means displaying, stepwise, change in said capacitance in accordance with the detection signal from said detection circuit; and a phase difference determining circuit determining phase difference between the resonance frequency of said resonance circuit and the oscillation frequency of said variable frequency generating circuit based on the phase difference signal output from said phase comparing circuit, makes said phase comparing circuit operate such that the oscillation frequency of said variable frequency generating circuit follow the resonance frequency of said resonance circuit, in response to a determination of presence of a phase difference, and outputting the detection signal from said detection circuit when phase deviation from the resonance frequency of said resonance circuit exceeds a predetermined value by the change in the oscillation frequency of said variable frequency generating circuit at the time of measurement.

10. The capacitance type detector according to claim 9, wherein said detecting means includes a microprocessor, and said microprocessor includes a detection state setting circuit setting whether a state of said object of detection is a detection state or not, a signal processing setting circuit for setting whether a frequency is for the detection state or not, dependent on whether said detection state setting circuit set the detection state or not, a storing circuit storing a frequency at the detection state or a frequency at the detection state set by said signal processing setting circuit, a comparing circuit comparing the frequency stored in said storing circuit with a present frequency applied from said variable frequency generating circuit, and outputting data representing whether the present frequency is higher than the frequency at the detection state or not, and a circuit responsive to a signal representing presence of a phase difference from said phase difference determining circuit, outputting data representing presence of the object of detection, and responsive to application of a signal representing absence of a phase difference, outputting data from said comparing circuit.

* * * * *